United States Patent
Tran et al.

(10) Patent No.: US 7,398,935 B2
(45) Date of Patent: *Jul. 15, 2008

(54) METHODS AND COMPOSITIONS FOR DUST CONTROL AND FREEZE CONTROL

(75) Inventors: Bo L. Tran, Chicago, IL (US); Sankar Bhattacharja, Niles, IL (US); Stephen J. Blubaugh, Naperville, IL (US)

(73) Assignee: Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/490,193

(22) Filed: Jul. 20, 2006

(65) Prior Publication Data

US 2006/0284137 A1    Dec. 21, 2006

Related U.S. Application Data

(63) Continuation-in-part of application No. 10/846,218, filed on May 14, 2004, now Pat. No. 7,108,800.

(51) Int. Cl.
*B05D 5/08* (2006.01)

(52) U.S. Cl. .................... 241/16; 252/88.1; 427/212

(58) Field of Classification Search ............. 252/88.1, 252/70; 241/16; 44/601, 602, 620; 427/212
See application file for complete search history.

(56) References Cited

U.S. PATENT DOCUMENTS

| | | | |
|---|---|---|---|
| 4,117,214 A | | 9/1978 | Parks et al. |
| 4,388,203 A | | 6/1983 | Nimerick et al. |
| 4,417,992 A | | 11/1983 | Bhattacharyya et al. |
| 4,426,409 A | * | 1/1984 | Roe .................... 44/601 |
| 4,439,337 A | | 3/1984 | Nimerick et al. |
| 4,594,268 A | | 6/1986 | Kirwin |
| 4,689,251 A | | 8/1987 | Newman et al. |
| 5,104,711 A | | 4/1992 | Marsek |
| 5,194,174 A | | 3/1993 | Roe et al. |
| 5,439,608 A | | 8/1995 | Kondrats |
| 6,129,857 A | | 10/2000 | Sapienza |
| 6,315,919 B1 | | 11/2001 | Sapienza |
| 6,491,736 B1 | | 12/2002 | Bell et al. |
| 6,506,318 B1 | | 1/2003 | Sapienza et al. |
| 6,544,434 B2 | | 4/2003 | Sapienza |
| 6,589,442 B1 | | 7/2003 | Wilson et al. |
| 6,843,961 B2 | | 1/2005 | Sapienza |
| 6,890,451 B2 | * | 5/2005 | Sapienza et al. ............. 252/70 |
| 7,105,105 B2 | | 9/2006 | Samuels et al. |
| 7,108,800 B2 | * | 9/2006 | Tran et al. .................... 252/70 |
| 2001/0023653 A1 | | 9/2001 | Langford |
| 2002/0184933 A1 | | 12/2002 | Bell, III et al. |
| 2005/0087720 A1 | * | 4/2005 | Samuels et al. ............. 252/70 |

FOREIGN PATENT DOCUMENTS

| | | |
|---|---|---|
| EP | 0 195 638 B1 | 6/1991 |
| PL | 1987-268863 | 11/1987 |
| WO | WO 00/34200 | 6/2000 |
| WO | WO 02/098814 A1 | 12/2002 |

OTHER PUBLICATIONS

Hawley's Condensed Chemical Dictionary, 13th Edition, Revised by Richard J. Lewis, Sr., © 1997, p. 543 definition of glycerol.
CEH Product Review of Glycerin, Feb. 2003, by Elvira O. Camara Greiner with Ralf Gubler and Kazuo Yagi, © 2003 by the Chemical Economics Handbook—SRI International.

* cited by examiner

*Primary Examiner*—Lorna M. Douyon
*Assistant Examiner*—Amina Khan
(74) *Attorney, Agent, or Firm*—Michael B. Martin

(57) ABSTRACT

Dust control and/or freeze control compositions and methods of using the compositions are provided. In an embodiment, the present invention provides methods of utilizing the dust control and/or freeze control products. For example, the method can comprise preventing the agglomeration of particulate material comprising coal and the adhesion thereof to surfaces in subfreezing weather. The method can also comprise preventing dust formation from particulate material handling processes. The dust control and/or freeze control compositions can comprise one or more glycerin by-products derived from a biodiesel manufacturing process. The dust control and/or freeze control compositions can also comprise one or more glycerin by-products of transesterification reactions involving triglycerides.

25 Claims, No Drawings

METHODS AND COMPOSITIONS FOR DUST
CONTROL AND FREEZE CONTROL

CROSS REFERENCE TO RELATED APPLICATIONS

This is a continuation-in-part of Ser. No. 10/846,218, filed May 14, 2004 now U.S. Pat. No. 7,108,800.

TECHNICAL FIELD

This invention relates to dust control and freeze control. More particularly, this invention concerns dust control and freeze control compositions comprising glycerin-containing by-products from a biodiesel manufacturing process or transesterification reactions involving triglycerides and method of using the fluids.

BACKGROUND OF THE INVENTION

Dust from traffic on dirt roads and from the handling of particulate products can create significant health, environmental and safety problems. At mining facilities, industrial sites and construction sites, operations may be significantly restricted by dust cloud formation. In addition, dust can adversely affect human health and the environment.

Known dust controlling agents include oils, paper making byproducts such as ligno-sulfonate dispersions, and water, optionally containing various salts such as magnesium and calcium chloride, or sodium chloride. U.S. Pat. No. 6,589,442, teaches us a partially saponified mixture of crude tall oil and vegetable oil, emulsified in water, can be used as a dust control agent.

Dust problems can persist even in subfreezing temperatures. It is desirable to utilize cost-effective dust control agents that are green and are derived from renewable sources.

In particulate and/or aggregate handling operations, freezing weather can halt operations. For example, coal can carry a significant amount of moisture. The moisture on the surface of the coal and in the coal, when frozen, causes the chunks of coal to agglomerate into large, unwieldy lumps, creating a handling problem. The coal can also freeze to the walls of hopper cars and railroad cars that are used to transport the coal, which further causes a material handling problem. It would be desirable to identify an economical and highly-effective freeze control agent that is green and derived from renewable sources.

Deicing and anti-icing compositions comprising glycerol-containing by-products of triglyceride processing processes are disclosed in U.S. Pat. No. 6,890,451. Deicing and anti-icing compositions comprising short-chain polyols including glycerol and various wetting agents, antioxidants/preservatives, buffers, and/or freeze point depressants are disclosed in US 2005/0087720 A1. In the foregoing references, "deicing" is understood to mean removal of frozen precipitation from a surface after it has already formed. "Anti-icing" refers to application of an anti-icing fluid on to a surface before ice is present in order to lower the freezing point of any precipitation which contacts the surface thereby preventing it from turning into ice.

SUMMARY OF THE INVENTION

This invention concerns dust control and/or freeze control compositions comprising a glycerin-containing by-product from a biodiesel manufacturing process or transesterification reactions involving triglycerides. The dust control and freeze control compositions of this invention are cost-effective, green and derived from renewable sources.

In an embodiment, this invention is a method of preventing the agglomeration of a particulate material and the adhesion thereof to surfaces upon exposure of the material to subfreezing temperatures comprising a) providing unagglomerated particulate material; b) providing a composition comprising a glycerin-containing by-product formed from a manufacturing process for making fatty acid esters from at least one oil selected from the group consisting of vegetable oil and animal fats; and c) applying said composition to the unagglomerated particulate material in an amount sufficient to suppress agglomeration of the particulate material and its adhesion to surfaces upon exposure of the particulate material to said subfreezing temperatures.

In another embodiment, this invention is a method of preventing the generation of dust from particulate materials comprising a) providing a particulate material; b) providing a composition comprising a glycerin-containing by-product formed from a manufacturing process for making fatty acid esters from at least one oil selected from the group consisting of vegetable oil and animal fats; and c) applying said composition to the particulate material an amount effective to wet the surface of the material and substantially prevent the generation of dust from the particulate material.

In another embodiment, this invention is a method of preventing the generation of dust from a dirt road comprising a) providing a dirt road; b) providing a composition comprising a glycerin-containing by-product formed from a manufacturing process for making fatty acid esters from at least one oil selected from the group consisting of vegetable oil and animal fats; and c) applying said composition to the dirt road in an amount effective to wet the surface of the dirt road and substantially prevent the generation of dust from the dirt road.

DETAILED DESCRIPTION OF THE INVENTION

This invention uses glycerin-containing by-products of transesterification reactions involving triglycerides including biodiesel manufacturing processes to prevent the agglomeration and adhesion of particulate materials to surfaces in subfreezing temperatures, to suppress the generation of dust from particulate materials and dirt roads. By-product glycerin obtained as described herein is cost effective and "green", i.e. non-hazardous, non-toxic, biodegradable, environmentally friendly, and/or derived from renewable sources.

"Transesterification reactions involving triglycerides" as used herein refers to the splitting of triglyceride esters derived from vegetable oils and/or animal fats in the presence of base and a monohydroxy alcohol such as methanol or ethanol to produce monoesters of the fatty acids comprising the original triglycerides.

Triglycerides, the principal components of animal fats and of vegetable oils, are esters of glycerol, a trihydric alcohol, with different fatty acids of varying molecular weight associated with the particular fat or oil. The most common fatty acids sourced from natural fats and oils include palmitic, stearic and linoleic acid. Representative fats and oils used in the transesterification reactions described herein include tallow, crude tall oil, virgin vegetable oils, soy, mustard, canola, coconut, rapeseed, palm, poultry offal, fish oils, used cooking oils, and/or trap grease, and the like.

In an embodiment, the glycerin-containing by-product is derived from a biodiesel manufacturing process.

Biodiesel is a cleaner-burning diesel replacement fuel made from natural, renewable sources. For example, biodiesel can include fatty acid alkyl esters used as a cleaner-burning diesel replacement fuel made from sources such as new and used vegetable oils and animal fats.

According to the American Fuel Data Center of the U.S. Department of Energy, approximately 55% of the biodiesel is currently produced from recycled fat or oil feedstock, including recycled cooking grease. The other half of the industry is limited to vegetable oils, the least expensive of which is soy oil. The soy industry has been the driving force behind biodiesel commercialization because of excess production capacity, product surpluses, and declining prices. Similar issues apply to the recycled grease and animal fats industry, even though these feedstocks are less expensive than soy oils. Based on the combined resources of both industries, there is enough of the feedstock to supply 1.9 billion gallons of biodiesel.

Biodiesel is typically made through a chemical process called transesterification in which vegetable oil or animal fats are converted to fatty acid alkyl esters and glycerin by-products. Fatty acids and fatty acid alkyl esters can be produced from oils and fats by base-catalyzed transesterification of the oil, direct acid-catalyzed esterification of the oil and conversion of the oil to fatty acids and subsequent esterification to biodiesel.

The majority of fatty acid alkyl esters are produced by the base-catalyzed method. In general, any base may be used as the catalyst used for transesterification of the oil to produce biodiesel, however sodium hydroxide or potassium hydroxide are used in most commercial processes.

In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel and the oils and fats are added. The system can then be closed, and held at about 71° C. (160° F.) for a period of about 1 to 8 hours, although some systems recommend that the reactions take place at room temperature.

Once the reactions are complete the oil molecules (e.g. triglycerides) are hydrolyzed and two major products are produced: 1) a crude fatty acid alkyl esters phase (i.e. biodiesel phase) and 2) a glycerin by-product phase. Typically, the crude fatty acid alkyl esters phase forms a layer on top of the denser glycerin by-product phase. Because the glycerin by-product phase is denser than the biodiesel phase, the two can be gravity separated. For example, the glycerin by-product phase can be simply drawn off the bottom of a settling vessel. In some cases, a centrifuge may be employed to speed the separation of the two phases.

The glycerin by-product phase typically consists of a mixture of glycerin, methyl esters, methanol, mong and inorganic salts and water. Mong is "matiere organique non glycerol". Mong normally consists of soaps, free fatty acids, and other impurities.

Methyl esters and methanol are typically present in an amount of about 0.01 to about 5 percent.

Typical inorganic salts include, for example, salts (e.g. chlorides and sulfates) of sodium, potassium and/or calcium. In an embodiment, the by-products can contain about 0.01 to about 15 weight percent of the inorganic salts. In an embodiment, the inorganic salts are selected from sodium chloride, potassium chloride, calcium chloride and mixtures thereof.

In an embodiment, the glycerin-containing by-product comprises about 45 to 90 weight percent glycerin, about 5 to about 50 weight percent water and about 0.01 to about 15 weight percent inorganic salts.

The glycerin-containing by-product may optionally be diluted with a suitable diluent to reduce the cost per square meter of surface being treated. A preferred diluent is water. The amount of diluent may vary with the conditions, and may be determined at the site of use, depending upon the nature of the particulate matter (dirt roads, coal piles, sand piles, or the like) and the temperature at time of application.

In an embodiment, the glycerin-containing by-product is diluted with about 10 to about 400 weight percent water, based on the weight of said by-product.

We have discovered that application of compositions comprising the glycerin-containing by-products described herein effectively prevent the agglomeration of particulate materials and adhesion of the particulate materials to surfaces upon exposure to subfreezing temperatures. This phenomena is referred to as "freeze conditioning".

Without being limited by theory, it is believed that freeze conditioning results from a weakening of the bonds between forming ice crystals due to the glycerin and other impurities contained in the by-product, thereby preventing agglomeration of the particulate material into a solid mass. Thus, although water contained in the particulate material is frozen in a typical application, the particulate material does not freeze into a solid mass.

Freeze conditioning is therefore distinct from de-icing, in which formed ice is converted to water by freezing point depression of the ice, or anti-icing in which an agent is applied to a surface or material to prevent formation of ice when the surface or material is contacted by precipitation. Most importantly, the dosage required for freeze conditioning is substantially lower than the dosage required for deicing or anti-icing.

By way of example, a ton of coal may contain 8% (160 pounds) of water. In order to reduce the freezing point of the water to −25° F., the coal would have to be treated with about 85 pounds of pure glycerin. By contrast, agglomeration of the coal at the same temperature can be effectively prevented by applying a composition containing 2-3 pounds of glycerin-containing by-product as described herein to the unagglomerated coal. This example demonstrates that although the moisture contained in the coal treated according to this invention is frozen, the coal remains unagglomerated and manageable at a fraction of the dosage required for deicing.

Accordingly, in an embodiment, this invention is a method of preventing the agglomeration of particulate material, such as coal, wood chips, fertilizers and aggregates and the adhesion thereof to surfaces in subfreezing temperatures, which comprises applying to said particulate material the glycerin-containing by-product while the particulate material is in an unagglomerated state in an amount effective to prevent agglomeration of the material upon exposure to subfreezing temperatures.

As used herein, "aggregates" refers to a mixture of particulate mineral materials including mining and mineral ores, sand, gravel, phosphate, soda ash, kaolin, silica, cement, iron, taconite, alumina bauxite, and the like In a typical freeze control application, the glycerin-containing by-product is diluted with water to provide a composition containing about 20 to about 60 weight percent of glycerin.

For example, to prevent agglomeration of coal is about 2 to about 4 pints of glycerin-containing by-product composition is applied per ton coal. This dosage has been shown to effectively weaken the ice crystals to prevent agglomeration in subfreezing weather.

The composition is applied to the particulate material while it is in an unagglomerated, free-flowing state, for example by spraying onto the material as it is falling from a chute or being transported on a conveyor.

In some embodiments the composition is applied to the particulate material at a dosage of about 200 to about 1400 g of glycerin per ton of particulate material.

As described herein, this invention provides effective freeze control, preventing freeze agglomeration of particulate materials, such as coal. An unexpected benefit of the glycerin-containing by-product is its freeze point depressant property. The invention shows greater freeze point depressant characteristics than expected. For example, a 50% aqueous solution of pure glycerin freezes at about −27.2° C. (−17° F.). A 50% aqueous solution of a preferred formulation of this invention freezes at about −40° C. (about −40° F.). Thus, compositions of this invention may be used even under arctic winter conditions as an anti-agglomerating/adhesion/dust control agent as the composition will not freeze during storage or application. It is likewise unnecessary to add additional freeze-point depressants to the composition.

In some embodiments, the glycerin-containing by-product has a freezing point of at least about −35° C.

Compositions of this invention also control dust through their inherent binding and humectant properties. Accordingly, in some embodiments, this invention provides methods of preventing the generation of dust from particulate materials comprising adding an amount of glycerin-containing by-product composition effective to wet the surface of the particulate material and prevent the generation of dust.

The composition may suitably be applied to any particulate capable of generating dust when disturbed, handled or processed.

In some embodiments, the particulate materials are selected from coal, wood chips, fertilizers, soil, dirt and aggregates.

In other embodiments, this invention provides methods of preventing the generation of dust from dirt roads comprising adding an amount of glycerin-containing by-product composition effective to wet the surface of the road and prevent the generation of dust.

"Dirt roads" refers to unpaved surfaces including roads, paths, tracks, parking lots and the like and paved surfaces as described above comprising a dust-generating amount of particulate materials such as dirt, sand, gravel and the like.

In dust control applications, the glycerin-containing by-product is typically diluted with water to provide a composition comprising about 20 to about 80 weight percent of glycerin.

In dust control embodiments, the composition is applied to the particulate material at a dosage of about 200 to about 2400 grams of glycerin per ton of particulate material.

For application to dirt roads, the composition may be applied to the road at a dosage of about 200 to about 1000 grams of glycerin per square yard of road surface.

The foregoing may be better understood by reference to the following examples, which are presented for purposes of illustration and are not intended to limit the scope of the invention.

EXAMPLE 1

Dust Control

Crude glycerin solution is obtained from a biodiesel synthesis process. In this embodiment, the crude glycerin component comprises about 80 weight percent of glycerin, about 10-11 weight percent of water, about 7 weight percent of sodium chloride, and about 1-2 weight percent of fatty acids and methyl esters thereof. The product is diluted with 100 weight percent of water to provide a 40% solution of the crude glycerin byproduct. The composition is applied to a dusty road in a dosage of one quart per square yard.

The diluted, crude glycerin is highly effective in reducing dust generation from passing vehicles. Generation of road dust is further prevented for four weeks before a maintenance application is needed. Current industry practice is to use water or salt to control road dust. These applications are effective but they last only an hour up to several days before another application is required. Treatment according to this invention can last weeks.

Also, the diluted product retains a freezing point of about −28.8° C. (about −20° F.). This is to be contrasted with a freezing point for a 40% pure glycerin solution in water of about −17° C. (about 1° F.). Thus, the diluted product of this example is highly suitable for use at subzero temperatures, for the suppression of dust and/or for freeze control of particulate products such as coal, as described above.

EXAMPLE 2

Freeze Control

The glycerin-containing by-product composition of Example 1 is applied to unagglomerated coal in open rail cars using a spray nozzle that applies the composition as the coal comes off the conveyor belt and lands in the rail car. A dosing level of from about two to about four pints of material as applied is used per ton of coal.

The coal is then shipped to power plants during in subfreezing temperatures during the winter months where it arrives in an unagglomerated state and is readily removed from the rail cars and handled at the power plant.

While the present invention is described above in connection with representative or illustrative embodiments, these embodiments are not intended to be exhaustive or limiting of the invention. Rather, the invention is intended to cover all alternatives, modifications and equivalents included within its spirit and scope, as defined by the appended claims.

The invention claimed is:

1. A method of preventing the agglomeration of a particulate material and the adhesion thereof to surfaces upon exposure of the material to subfreezing temperatures comprising
   a) providing unagglomerated particulate material;
   b) providing a composition consisting of a glycerin-containing by-product formed from a manufacturing process for making fatty acid esters from at least one oil selected from the group consisting of vegetable oil and animal fats; and
   c) applying a dosage of about 200 to about 1400 g of glycerin per ton of particulate material of said composition to said unagglomerated particulate material wherein said dosage is an amount sufficient to suppress agglomeration of the particulate material and its adhesion to surfaces upon exposure of the particulate material to said subfreezing temperatures and wherein said dosage is substantially lower than the dosage required for deicing or anti-icing.

2. The method of claim 1 wherein said manufacturing process is a biodiesel manufacturing process of forming fatty acid esters from vegetable oils, animal fats or a mixture thereof.

3. The method of claim 2 wherein the glycerin-containing by-product consists of glycerin, methyl esters, methanol, inorganic salts, soaps, free fatty acids, water and other impurities.

4. The method of claim 3 wherein said glycerin is present in an amount of about 45 to 90 weight percent, said water is present in an amount of about 5 to about 50 weight percent water and said inorganic salts are present in an amount of about 0.01 to about 15 weight percent in said by-product.

5. The method of claim 4 wherein the salt is sodium chloride, potassium chloride, calcium chloride or a mixture thereof.

6. The method of claim 1 wherein after step b) said composition is diluted with about 10 to about 400 weight percent water, based on the weight of said by-product.

7. The method of claim 6 wherein the diluted composition has a freezing point of at least about −36° C.

8. The method of claim 1 wherein said particulate material is selected from coal, wood chips, fertilizers and aggregates.

9. The method of claim 1 wherein said particulate material is coal.

10. A method of preventing the generation of dust from particulate materials comprising
   a) providing a particulate material;
   b) providing a composition consisting of a glycerin-containing by-product formed from a manufacturing process for making fatty acid esters from at least one oil selected from the group consisting of vegetable oil and animal fats; and
   c) applying a dosage of about 200 to about 2400 g of glycerin per ton of particulate material of said composition to the particulate material wherein said dosage is an amount effective to wet the surface of the material and substantially prevent the generation of dust from the particulate material and wherein said dosage is substantially lower than the dosage required for deicing or anti-icing.

11. The method of claim 10 wherein said manufacturing process is a biodiesel manufacturing process of forming fatty acid esters from vegetable oils, animal fats or mixtures thereof.

12. The method of claim 11 wherein the glycerin-containing by-product consists of glycerin, methyl esters, methanol, inorganic salts, soaps, free fatty acids, water and other impurities.

13. The method of claim 12 wherein said glycerin is present in an amount of about 45 to 90 weight percent, said water is present in an amount of about 5 to about 50 weight percent water and said inorganic salts are present in an amount of about 0.01 to about 15 weight percent in said by-product.

14. The method of claim 13 wherein the salt is sodium chloride, potassium chloride, calcium chloride or a mixture thereof.

15. The method of claim 10 wherein after step b) said composition is diluted with about 10 to about 400 weight percent water, based on the weight of said by-product.

16. The method of claim 15 wherein the diluted composition has a freezing point of at least about −35° C.

17. The method of claim 10 wherein said particulate material is selected from the group consisting of materials which can generate dust when disturbed, handled or processed.

18. The method of claim 10 wherein said particulate material is selected from coal, wood chips, fertilizers, soil, dirt and aggregates.

19. A method of preventing the generation of dust from a dirt road comprising
   a) providing a dirt road;
   b) providing a composition consisting of a glycerin-containing by-product formed from a manufacturing process for making fatty acid esters from at least one oil selected from the group consisting of vegetable oil and animal fats; and
   c) applying a dosage of about 200 to about 1000 g of glycerin per square yard of road surface of said composition to the dirt road wherein said dosage is an amount effective to wet the surface of the dirt road and substantially prevent the generation of dust from the dirt road and wherein said dosage is substantially lower than the dosage required for deicing or anti-icing.

20. The method of claim 19 wherein said manufacturing process is a biodiesel manufacturing process of forming fatty acid esters from vegetable oils, animal fins or mixtures thereof.

21. The method of claim 19 wherein the glycerin-containing by-product consists of glycerin, methyl esters, methanol, inorganic salts, soaps, free fatty acids, water and other impurities.

22. The method of claim 21 wherein said glycerin is present in an amount of about 45 to 90 weight percent, said water is present in an amount of about 5 to about 50 weight percent water and said inorganic salts are present in an amount of about 0.01 to about 15 weight percent in said by-product.

23. The method of claim 22 wherein the salt is sodium chloride, potassium chloride, calcium chloride or a mixture thereof.

24. The method of claim 19 wherein after step b) said composition is diluted with about 10 to about 400 weight percent water, based on the weight of said by-product.

25. The method of claim 24 wherein the diluted composition has a freezing point of at least about −3° C.

* * * * *

UNITED STATES PATENT AND TRADEMARK OFFICE
CERTIFICATE OF CORRECTION

PATENT NO. : 7,398,935 B2  Page 1 of 1
APPLICATION NO. : 11/490193
DATED : July 15, 2008
INVENTOR(S) : Bo L. Tran et al.

It is certified that error appears in the above-identified patent and that said Letters Patent is hereby corrected as shown below:

Col. 7, Line 24:

has a freezing point of at least about -36° C.

should read has a freezing point of at least about -35° C.

Col. 8, Line 53:

has a freezing point of at least about -3° C.

should read has a freezing point of at least about -35° C.

Signed and Sealed this

Fourth Day of November, 2008

JON W. DUDAS
*Director of the United States Patent and Trademark Office*